United States Patent
Okajima et al.

(10) Patent No.: US 11,307,591 B2
(45) Date of Patent: Apr. 19, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Noboru Okajima, Wako (JP); Tatsuya Iwasa, Wako (JP); Yusuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 16/469,694

(22) PCT Filed: Jan. 24, 2017

(86) PCT No.: PCT/JP2017/002281
§ 371 (c)(1),
(2) Date: Jun. 14, 2019

(87) PCT Pub. No.: WO2018/138765
PCT Pub. Date: Aug. 2, 2018

(65) Prior Publication Data
US 2019/0354108 A1    Nov. 21, 2019

(51) Int. Cl.
*G05D 1/02* (2020.01)
*B60K 28/06* (2006.01)
(Continued)

(52) U.S. Cl.
CPC ........... *G05D 1/0214* (2013.01); *B60K 28/06* (2013.01); *B60W 30/143* (2013.01);
(Continued)

(58) Field of Classification Search
CPC  G05D 1/0214; B60W 30/143; B60W 30/165; B60W 30/182; B60W 50/10;
(Continued)

(56) References Cited

U.S. PATENT DOCUMENTS

| 2002/0018003 A1 | 2/2002 | Andreas et al. |
| 2013/0110343 A1 | 5/2013 | Ichikawa et al. |

(Continued)

FOREIGN PATENT DOCUMENTS

| CN | 105539441 | 5/2016 |
| CN | 106030677 | 10/2016 |

(Continued)

OTHER PUBLICATIONS

Machine translation of JP-2013232241-A, Tsuda Yoshiaki, Nov. 2013 (Year: 2013).*

(Continued)

*Primary Examiner* — Nicholas Kiswanto
*Assistant Examiner* — Mohamad O El Sayah
(74) *Attorney, Agent, or Firm* — Amin, Turocy & Watson, LLP

(57) ABSTRACT

A vehicle control system includes an acquirer that acquires information that allows recognition of a speed of another vehicle in a travel direction of an own vehicle, a determiner that determines whether or not a low speed section whose travel speed is equal to or less than a first predetermined speed is present in the travel direction of the own vehicle on the basis of the information acquired by the acquirer, and a controller that is able to perform an automated driving mode which is executed at a second predetermined speed or less and that performs predetermined control before the own vehicle reaches the low speed section that has been determined as being present by the determiner.

17 Claims, 10 Drawing Sheets

(51) Int. Cl.
  *B60W 30/14* (2006.01)
  *B60W 30/165* (2020.01)
  *B60W 30/182* (2020.01)
  *B60W 50/10* (2012.01)
  *B60W 50/14* (2020.01)
  *B62D 6/00* (2006.01)
  *G01C 21/34* (2006.01)
  *G01C 21/36* (2006.01)
  *G08G 1/16* (2006.01)

(52) U.S. Cl.
  CPC ........ *B60W 30/165* (2013.01); *B60W 30/182* (2013.01); *B60W 50/10* (2013.01); *B60W 50/14* (2013.01); *B62D 6/00* (2013.01); *G01C 21/3415* (2013.01); *G01C 21/3617* (2013.01); *G08G 1/16* (2013.01); *B60W 2720/10* (2013.01)

(58) Field of Classification Search
  CPC ..... B60W 50/14; B60W 2720/10; B62D 6/00; G01C 21/3415; G01C 21/3617; G08G 1/16
  See application file for complete search history.

(56) References Cited

U.S. PATENT DOCUMENTS

| | | | |
|---|---|---|---|
| 2016/0307444 A1 | 10/2016 | Koshizen | |
| 2018/0143028 A1* | 5/2018 | Choi | G01C 21/3492 |
| 2018/0181135 A1* | 6/2018 | Urano | B60W 60/0011 |
| 2019/0322285 A1* | 10/2019 | Lagre | B60W 50/0097 |
| 2020/0272147 A1* | 8/2020 | Hashimoto | G08G 1/162 |

FOREIGN PATENT DOCUMENTS

| | | | | |
|---|---|---|---|---|
| JP | 05-266399 | | 10/1993 | |
| JP | 2005-173663 | | 6/2005 | |
| JP | 2006-248334 | | 9/2006 | |
| JP | 2006248334 A | * | 9/2006 | ........... B60W 30/16 |
| JP | 2010-143551 | | 7/2010 | |
| JP | 2011-162132 | | 8/2011 | |
| JP | 2013-232241 | | 11/2013 | |
| JP | 2013232241 A | * | 11/2013 | ........... G08G 1/161 |
| JP | 2015-168406 | | 9/2015 | |
| JP | 2016146129 A | * | 8/2016 | |
| JP | 2016-201059 | | 12/2016 | |
| WO | WO-2010082353 A1 | * | 7/2010 | ........... G08G 1/0104 |
| WO | 2011-158347 | | 12/2011 | |
| WO | WO-2016092796 A1 | * | 6/2016 | ........... G05D 1/0061 |
| WO | 2016/113890 | | 7/2016 | |

OTHER PUBLICATIONS

Machine translation of WO-2010082353-A1, Sato Kunihito, Jul. 2010 (Year: 2010).*
Machine trasnlation of JP-2006248334-A, Makino, Yasushi (Year: 2006).*
Machine translation of JP-2016146129-A, Kondo Yoshito (Year: 2016).*
International Search Report and Written Opinion for International Application No. PCT/JP2017/002281 dated Mar. 28, 2017, 12 pgs.
Japanese Office Action for Japanese Patent Application No. 2018-563959 dated Jan. 7, 2020.
Chinese Office Action for Chinese Patent Application No. 201780079021.9 dated Oct. 20, 2021.

* cited by examiner

| VEHICLE ID | LINK ID | TIME |
|---|---|---|
| 001 | 10001 | 09:00:30 |
| 002 | 10001 | 09:00:30 |
| 003 | 10001 | 09:00:30 |
| ⋮ | ⋮ | ⋮ |

FIG. 7

| LINK ID | LINK DISTANCE | LINK TRAVEL TIME | LINK TRAVEL SPEED |
|---------|---------------|------------------|-------------------|
| 1000 | □□m | 60秒 | 100km |
| 1001 | △△m | 80秒 | 60km |
| 1002 | ○○m | 80秒 | 50km |
| ⋮ | ⋮ | | |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on a technology for controlling an own vehicle such that it automatically travels along a route to a destination has advanced. In this regard, a driving support device that, when instructed by the driver's operation to start automated driving of the own vehicle, generates a route for automated driving and starts automated driving if a destination has been set and performs automated driving to travel along the current travel route of the own vehicle if no destination has been set is known (see, for example, Patent Document 1).

CITATION LIST

Patent Literature

[Patent Document 1]
PCT International Publication No. WO 2011/158347

SUMMARY OF INVENTION

Technical Problem

However, the related art does not involve considering the flow of traffic in the travel direction of the vehicle on the premise that there is an automated driving mode that is selected according to the speed thereof. Therefore, the vehicle's behaviors which can be implemented as those of automated driving may be restricted.

The present invention has been made in view of the above circumstances and it is an object of the present invention to provide a vehicle control system, a vehicle control method, and a vehicle control program which can enhance the adaptability of automated driving.

Solution to Problem

According to an aspect, a vehicle control system includes an acquirer configured to acquire information that allows recognition of a speed of another vehicle in a travel direction of an own vehicle, a determiner configured to determine whether or not a low speed section whose travel speed is equal to or less than a first predetermined speed is present in the travel direction of the own vehicle on the basis of the information acquired by the acquirer, and a controller capable of executing an automated driving mode which is executed at a second predetermined speed or less, the controller being configured to perform predetermined control before the own vehicle reaches the low speed section that has been determined as being present by the determiner.

According to another aspect, in the vehicle control system, the controller is configured to perform, as the predetermined control, causing an output unit to output predetermined information before the own vehicle reaches the low speed section.

According to another aspect, in the vehicle control system, the controller is configured to perform, as the predetermined control, causing the own vehicle to change lanes before the own vehicle reaches the low speed section.

According to another aspect, in the vehicle control system, the controller is configured to perform the predetermined control if in the low speed section there is a branch point for entering a branch road from a main line when the own vehicle is to travel along a predetermined route.

According to another aspect, in the vehicle control system, the controller is configured to perform prohibition of lane change as the predetermined control when the own vehicle is traveling in a lane connected to a branch road if in the low speed section there is a branch point for entering the branch road from a main line when the own vehicle is to travel along a predetermined route.

According to another aspect, in the vehicle control system, the automated driving mode which is executed at the second predetermined speed or less is an automated driving mode in which no lane change is performed.

According to another aspect, a vehicle control system includes an acquirer configured to acquire information indicating that a low speed section whose travel speed is equal to or less than a first predetermined speed is present in a travel direction of an own vehicle, and a controller capable of executing an automated driving mode which is executed at a second predetermined speed or less, the controller being configured to perform predetermined control before the own vehicle reaches the low speed section that is identified on the basis of the information acquired by the acquirer.

According to another aspect, a vehicle control method includes an in-vehicle computer acquiring information that allows recognition of a speed of another vehicle in a travel direction of an own vehicle, determining whether or not a low speed section whose travel speed is equal to or less than a first predetermined speed is present in the travel direction of the own vehicle on the basis of the acquired information, allowing execution of an automated driving mode which is executed at a second predetermined speed or less, and performing predetermined control before the own vehicle reaches the low speed section that has been determined as being present.

According to another aspect, a vehicle control program causing an in-vehicle computer to acquire information that allows recognition of a speed of another vehicle in a travel direction of an own vehicle, determine whether or not a low speed section whose travel speed is equal to or less than a first predetermined speed is present in the travel direction of the own vehicle on the basis of the acquired information, allow execution of an automated driving mode which is executed at a second predetermined speed or less, and perform predetermined control before the own vehicle reaches the low speed section that has been determined as being present.

Advantageous Effects of Invention

According to aspects above, the controller is configured to perform predetermined control before the own vehicle reaches the low speed section that has been determined as being present by the determiner. Thus, it is possible to enhance adaptability of automated driving.

According to aspects above, the controller is configured to perform, as the predetermined control, causing the output unit to output predetermined information. Thus, the occupant of the own vehicle can perceive the presence of a section whose travel speed is equal to or less than the first predetermined speed and can reflect the perception in control of the own vehicle before reaching the section.

According to aspects above, the controller is configured to perform, as the predetermined control, causing the own vehicle to change lanes. Thus, the own vehicle can more reliably enter a branch destination by automated driving.

According to aspects above, the controller is configured to prohibit lane change of the own vehicle when it is traveling in a lane connected to the branch road. Thus, it is possible to reduce the risk of failure of the own vehicle to smoothly enter the branch road from the main line.

BRIEF DESCRIPTION OF DRAWINGS

FIG. 5 shows an example of vehicle information 318 stored in a server storage unit 306.

FIG. 7 is a diagram showing information that the vehicle system 1 acquires from a traffic information management server 300 and link travel speeds calculated on the basis of the information.

DESCRIPTION OF EMBODIMENTS

Hereinafter, embodiments of a vehicle control system, a vehicle control method, and a vehicle control program of the present invention will be described with reference to the drawings.

First Embodiment

Figure 1:
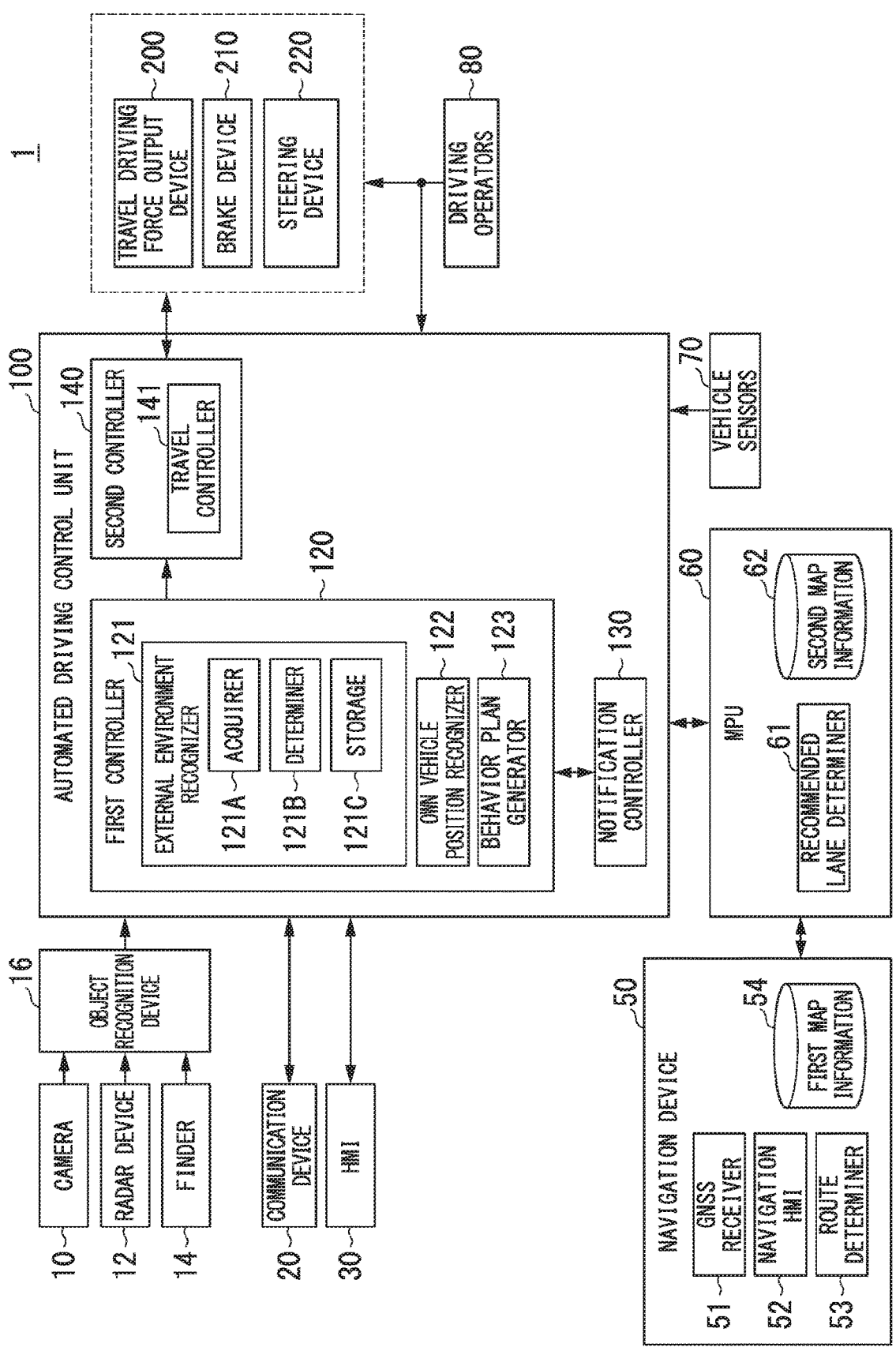
FIG. 1 is a configuration diagram of a vehicle system 1 including an automated driving control unit 100.

FIG. 1 is a configuration diagram of a vehicle system 1 including an automated driving control unit 100. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, vehicle sensors 70, driving operators 80, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added. In the present embodiment, the "vehicle control system" includes, for example, an acquirer 121A and a determiner 121B of an external environment recognizer 121, a behavior plan generator 123, and a notification controller 130. Further, the behavior plan generator 123, the notification controller 130, and a travel controller 141 are examples of the "controller."

The camera 10 is, for example, a digital camera using a solid-state imaging device such as a charge coupled device (CCD) or a complementary metal oxide semiconductor (CMOS). One or a plurality of cameras 10 are attached to the vehicle in which the vehicle system 1 is mounted (hereinafter referred to as an own vehicle M) at arbitrary locations. For imaging the area in front of the own vehicle M, a camera 10 is attached to an upper portion of a front windshield, a rear surface of a rearview mirror, or the like. For example, the camera 10 repeats imaging of the surroundings of the own vehicle M at regular intervals. The camera 10 may also be a stereo camera.

The radar device 12 radiates radio waves such as millimeter waves around the own vehicle M and detects radio waves reflected by an object (reflected waves) to detect at least the position (distance and orientation) of the object. One or a plurality of radar devices 12 may be attached to the own vehicle M at arbitrary locations. The radar device 12 may detect the position and speed of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the own vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own vehicle M and receives an input operation from the occupant. The HMI 30 includes various display devices, speakers, buzzers, touch panels, switches, keys, or the like.

The navigation device 50 includes, for example, a global navigation satellite system (GNSS) receiver 51, a navigation HMI 52, and a route determiner 53 and holds first map information 54 in a storage device such as a hard disk drive (HDD) or a flash memory. The GNSS receiver specifies the position of the own vehicle M on the basis of signals received from GNSS satellites. The position of the own vehicle M may also be specified or supplemented by an inertial navigation system (INS) using the output of the vehicle sensors 70. The navigation HMI 52 includes a display device, a speaker, a touch panel, a key, or the like.

The navigation HMI 52 may be partly or wholly shared with the HMI 30 described above. For example, the route determiner 53 determines a route from the position of the own vehicle M specified by the GNSS receiver 51 (or an arbitrary input position) to a destination input by the occupant using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The route determined by the route determiner 53 is output to the MPU 60. The navigation device 50 may also perform route guidance using the navigation HMI 52 on the basis of the route determined by the route determiner 53. The navigation device 50 may be implemented, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determiner 61 and holds the second map information 62 in a storage device such as an HDD or a flash memory. The recommended lane determiner 61 divides the route provided from the navigation device 50 into a plurality of blocks (for example, into blocks each 100 meters long in the direction in which the own vehicle M travels) and determines a recommended lane for each block by referring to the second map information 62. The recommended lane determiner 61 determines the number of the lane from the left in which to travel. When there is a branch point, a merge point, or the like on the route, the recommended lane determiner 61 determines a recommended lane such that the own vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include, for example, a vehicle speed sensor that detects the speed of the own vehicle M, an acceleration sensor that detects the acceleration thereof, a yaw rate sensor that detects an angular speed thereof about the vertical axis, an orientation sensor that detects the orientation of the own vehicle M, or the like.

The driving operators 80 include, for example, an accelerator pedal, a brake pedal, a shift lever, a steering wheel, and other operators. Sensors for detecting the amounts of operation or the presence or absence of operation are attached to the driving operators 80 and detection results thereof are output to either or both of the automated driving control unit 100 or the travel driving force output, brake, and steering devices 200, 210, and 220.

The automated driving control unit 100 includes, for example, a first controller 120, the notification controller 130, and a second controller 140. Each of the functional units of the first controller 120, the notification controller 130, and the second controller 140 is implemented by a processor such as a central processing unit (CPU) executing a program (software). Some or all of these functional units may be implemented by hardware such as a large scale integration (LSI), an application specific integrated circuit (ASIC), or a field-programmable gate array (FPGA) or may be implemented by hardware and software in cooperation.

The first controller 120 includes, for example, the external environment recognizer 121, an own vehicle position recognizer 122, and the behavior plan generator 123.

The external environment recognizer 121 recognizes states of a nearby vehicle(s) such as the position, speed and acceleration thereof on the basis of information that is input from the camera 10, the radar device 12, and the finder 14 directly or via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognizer 121 may also recognize the positions of guardrails or utility poles, parked vehicles, pedestrians, and other objects in addition to nearby vehicles.

The external environment recognizer 121 also includes, for example, the acquirer 121A, the determiner 121B, and a storage 121C. The acquirer 121A acquires information that allows recognition of the speed of other vehicles in the travel direction of the own vehicle M. The information that allows recognition of the speed of other vehicles is, for example, a link travel time indicating an average travel time for the link. The information that allows recognition of the speed of other vehicles may also be an average speed of vehicles traveling in a link or link travel times or speeds of vehicles acquired in detail for the vehicles traveling in a link. Further, the information that allows recognition of the speed of other vehicles may be information indicating the presence or absence of congestion in a link or a link group.

On the basis of the information acquired by the acquirer 121A, the determiner 121B determines whether or not there is a low speed section whose travel speed is equal to or less than a first predetermined speed in the travel direction of the own vehicle M. For example, the determiner 121B divides the length of the link by the link travel time to obtain a travel speed and compares this with a first predetermined speed. The first predetermined speed is, for example, 60 km/h. When the information that allows recognition of the speed of other vehicles described above is information indicating the presence or absence of congestion, it is assumed that a threshold value for determining the presence or absence of congestion is equal to or less than the first predetermined speed.

The storage 121C is realized, for example, using a random access memory (RAM) or a flash memory. The storage 121C stores the information acquired by the acquirer 121A or the processing results of the determiner 121B.

The own vehicle position recognizer 122 recognizes, for example, a (traveling) lane in which the own vehicle M is traveling and the relative position and attitude of the own vehicle M with respect to the traveling lane. The own vehicle position recognizer 122 recognizes the traveling lane, for example, by comparing a pattern of road lane lines (for example, an arrangement of solid and broken lines) obtained from the second map information 62 with a pattern of road lane lines near the own vehicle M recognized from an image captured by the camera 10. This recognition may be performed taking into consideration a position of the own vehicle M acquired from the navigation device 50 or a result of processing by the INS.

Figure 2:
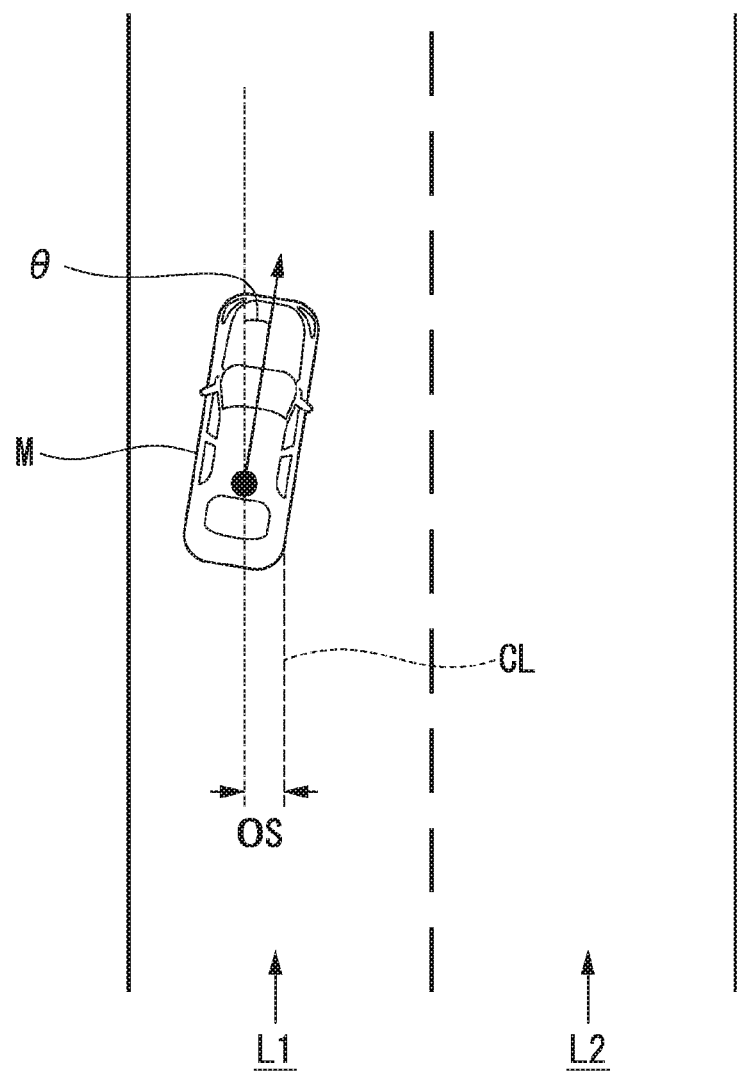
FIG. 2 is a diagram showing how the relative position and attitude of an own vehicle M with respect to a traveling lane L1 are recognized by an own vehicle position recognizer 122.

Then, the own vehicle position recognizer 122 recognizes, for example, the position or attitude of the own vehicle M with respect to the traveling lane. FIG. 2 is a diagram showing how the relative position and attitude of the own vehicle M with respect to the traveling lane L1 are recognized by the own vehicle position recognizer 122. For example, the own vehicle position recognizer 122 recognizes both a deviation OS from a traveling lane center CL of a reference point (for example, the center of gravity) of the own vehicle M and an angle θ formed by the travel direction of the own vehicle M relative to an extension line of the traveling lane center CL as the relative position and attitude of the own vehicle M with respect to the traveling lane L1. Alternatively, the own vehicle position recognizer 122 may recognize the position of the reference point of the own vehicle M with respect to one of the sides of the own lane L1 or the like as the relative position of the own vehicle M with respect to the traveling lane. The relative position of the own vehicle M recognized by the own vehicle position recognizer 122 is provided to the recommended lane determiner 61 and the behavior plan generator 123.

The behavior plan generator 123 determines events which are to be sequentially performed in the automated driving such that the own vehicle M travels in the recommended lane determined by the recommended lane determiner 61 and copes with situations occurring near the own vehicle M. Examples of the events include a constant-speed travel event which is an event of traveling in the same traveling lane at a constant speed, a following travel event which is an event of following a preceding vehicle, a lane change event, a merging event, a branching event, an emergency stop event, and a handover event which is an event of terminating automated driving and switching to manual driving. During execution of these events, behaviors for avoidance may sometimes be planned on the basis of situations occurring near the own vehicle M (such as the presence of nearby vehicles and pedestrians or lane narrowing due to road construction).

The behavior plan generator 123 generates a target trajectory along which the own vehicle M will travel in the future. The target trajectory includes, for example, a speed element. For example, the target trajectory is generated as a set of target points (trajectory points) to be reached at a plurality of future reference times which are set at intervals of a predetermined sampling time (for example, about tenths of a second). Therefore, when the interval between trajectory points is great, this means that the vehicle travels at a high speed in the section between the trajectory points.

Figure 3:
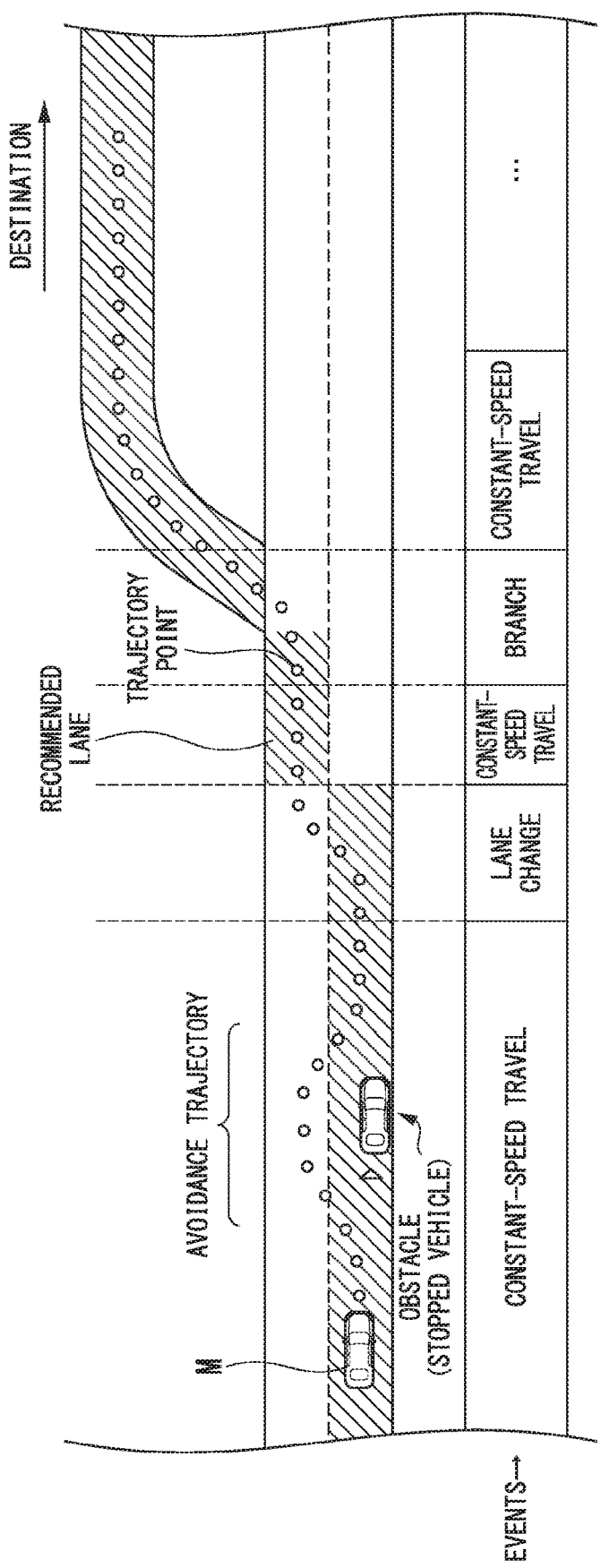
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own vehicle M approaches a predetermined distance (which may be determined according to the types of events) before a point for switching to the recommended lane, the behavior plan generator 123 activates a lane change event, a branching event, a merging event, or the like. When it becomes necessary to avoid an obstacle during execution of each event, an avoidance trajectory is generated as shown in FIG. 3.

For example, the behavior plan generator 123 generates a plurality of candidate target trajectories and selects an optimum target trajectory at a given point in time from the viewpoint of safety and efficiency. The travel controller 141 in the second controller 140 controls the travel driving force output device 200, the brake device 210, and the steering device 220 such that the own vehicle M passes along the target trajectory generated by the behavior plan generator 123 at scheduled times.

Here, the automated driving which is performed mainly by the first controller 120 is executed in one of a plurality of automated driving modes. The automated driving modes include an automated driving mode which is executed at a second predetermined speed (for example, 60 km/h) or less. An example of this is a low speed following travel (traffic jam pilot: TJP) in which the own vehicle M follows a preceding vehicle at the time of congestion. In the low speed following travel, safe automated driving can be realized by following a preceding vehicle on a congested freeway. It is to be noted that the first predetermined speed and the second predetermined speed may be equal or the first predetermined speed may be slightly higher than the second predetermined speed.

In the low speed following travel, lane change of the own vehicle M by the behavior plan generator 123 is prohibited. This is because congestion of vehicles blocks recognition of the nearby situation of the own vehicle M (in particular, the presence of two-wheeled vehicles overtaking the own vehicle M from behind the own vehicle M). The low speed following travel is canceled, for example, when the travel speed of the own vehicle M exceeds the second predetermined speed.

In an automated driving mode implemented when the own vehicle M travels at a speed higher than the second predetermined speed, the own vehicle M can change lanes according to events, which are sequentially executed in automated driving, and the nearby situation of the own vehicle M. This is because when the own vehicle M travels at a speed higher than the second predetermined speed, a certain distance or more is secured as the inter-vehicle distance between the own vehicle M and nearby vehicles and the own vehicle M can recognize its nearby situation without being blocked by other vehicles m.

The notification controller 130 causes an output unit (such as various display devices or a speaker) included in the HMI 30 or the navigation HMI 52 to output predetermined information, for example, when the own vehicle M is expected to reach a low speed section within a predetermined time or there is a low speed section within a predetermined distance in the travel direction of the own vehicle M. The predetermined information is, for example, information indicating that a low speed section will be reached in a predetermined time.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel controller 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel controller 141 such that a brake torque associated with a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel controller 141 and transmits the hydraulic pressure of the master cylinder to the cylinder.

The steering device 220 includes, for example, a steering ECU and an electric motor. The electric motor, for example, applies a force to a rack-and-pinion mechanism to change the direction of the steering wheel. The steering ECU drives the electric motor according to information input from the travel controller 141 or information input from the driving operators 80 to change the direction of the steering wheels.

Figure 4:
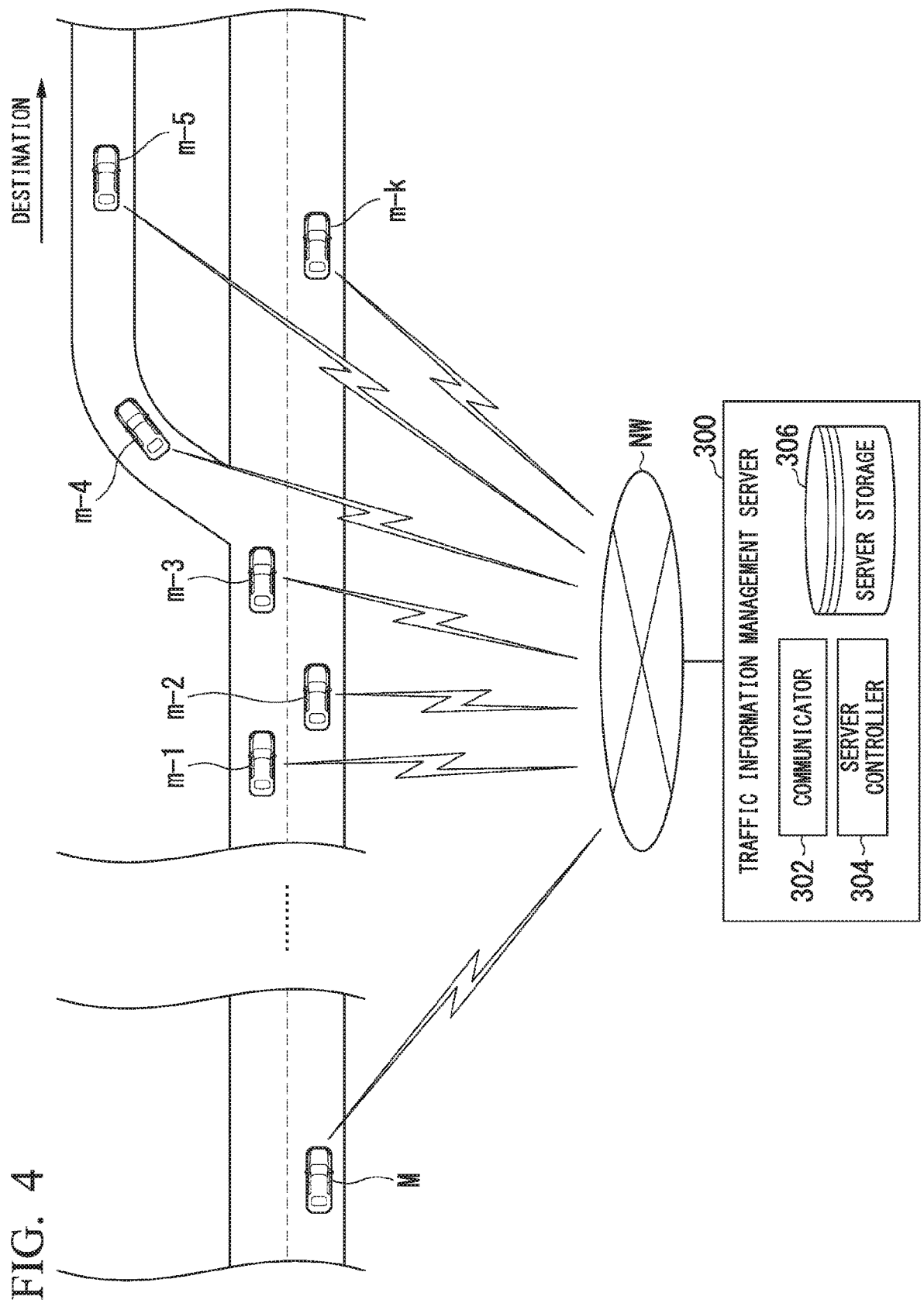
FIG. 4 is a diagram showing an example of a traffic information providing system including the own vehicle M in which the vehicle system 1 is mounted.

FIG. 4 is a diagram showing an example of a traffic information providing system including an own vehicle M in which the vehicle system 1 is mounted. The traffic information providing system includes the own vehicle M, other vehicles m-1 to m-k (where "k" is an arbitrary natural number), and a traffic information management server 300. Hereinafter, the other vehicles m-1 to m-k are referred to as "other vehicles m" unless otherwise distinguished. For example, at least a communication device that communicates with the traffic information management server 300 and a device having a function of specifying the position of the vehicle are mounted in some or all of the other vehicles m. The other vehicles m in which these devices are mounted transmit vehicle position information to the traffic information management server 300.

The traffic information management server 300 and vehicles including one or both of the own vehicle M and another vehicle m perform communication with each other using a network NW. The network NW is, for example, a cellular network, a Wi-Fi network, a wide area network (WAN), a local area network (LAN), or the Internet. Also, the own vehicle M at least acquires information transmitted from the traffic information management server 300 by receiving radio waves in a preset frequency band.

The traffic information management server 300 manages traffic information based on information transmitted by vehicles and detection results of vehicle detection sensors (for example, cameras) installed on a road. In addition, the traffic information management server 300 distributes the managed traffic information to vehicles at predetermined intervals using the network NW described above or transmits traffic information to a vehicle in response to a request from the vehicle.

The traffic information management server 300 includes, for example, a communicator 302, a server controller 304, and a server storage 306. The server controller 304 is implemented by a processor executing a program. The server controller 304 may be implemented by hardware such as an LSI or an ASIC or may be implemented by a combination of software and hardware. The server storage 306 is realized by a ROM, a RAM, an HDD, a flash memory, or the like.

The communicator 302 communicates with a vehicle to acquire information. The communicator 302 acquires a vehicle ID of the vehicle (identification information of the vehicle) and position information indicating the position of the vehicle together with the transmission time at which the information was transmitted. Hereinafter, these pieces of information are referred to as "vehicle information." Also, the communicator 302 acquires an image captured by the camera. The camera is installed on a road. In this case, the server controller 304 recognizes information described on a license plate through image analysis. This specifies a vehicle which has passed that location and thus a link travel time thereof is acquired by the traffic information management server 300.

The server controller 304 stores the vehicle information in the server storage unit 306. FIG. 5 is a diagram showing an example of the vehicle information 318 stored in the server storage 306. In the shown example, position information indicating the position of the vehicle is a link ID identifying a link indicating a road. The link ID is, for example, an ID assigned to each lane on a road. A link ID may also be assigned to each travel direction on a road or to each road. It is assumed that the link IDs are the same as link IDs assigned to roads in the first map information 54 and the second map information 62 included in the vehicle system 1 or IDs whose associated relationships are recognizable by the vehicle or the traffic information management server 300.

The server controller 304 transmits information relating to the vehicle information 318 to the own vehicle M in response to a request from the own vehicle M. In this case, the server controller 304 derives a link travel time for a link designated by the request by referring to the vehicle information 318 using the link designated by the request as a search key and provides the derived link travel time to the own vehicle M.

The server controller 304 may also transmit, to the own vehicle M, link travel times of vehicles acquired in detail for the vehicles traveling in a link. The server controller 304 may calculate the link travel speed of each vehicle which has traveled in the link on the basis of the link travel times of the vehicles acquired in detail for the vehicles traveling in the link and the link distance and transmit information on the calculated travel speed to the own vehicle M or transmit information on an average speed of the link to the own vehicle M. Also, the server controller 304 may derive information indicating the presence or absence of congestion in a link or a link group and transmit the information indicating the presence or absence of congestion to the own vehicle M. In this case, while the reference for congestion may differ from the second predetermined speed, the vehicle system 1 may use information indicating the presence or absence of congestion on the safe side.

In addition, upon acquiring a route search request from the own vehicle M, the server controller 304 may derive a route from the current position of the own vehicle M to the destination by referring to the map information and the traffic information stored in the traffic information management server 300 and transmit the derived route to the own vehicle M. If the route search request from the own vehicle M is, for example, a request to search for a route by which the destination can be reached in the shortest time from the current location, the server controller 304 derives a link travel time on the basis of the vehicle information 318 and searches for a route by which the destination can be reached in the shortest time with reference to the derived link travel time and the map information.

Figure 6:
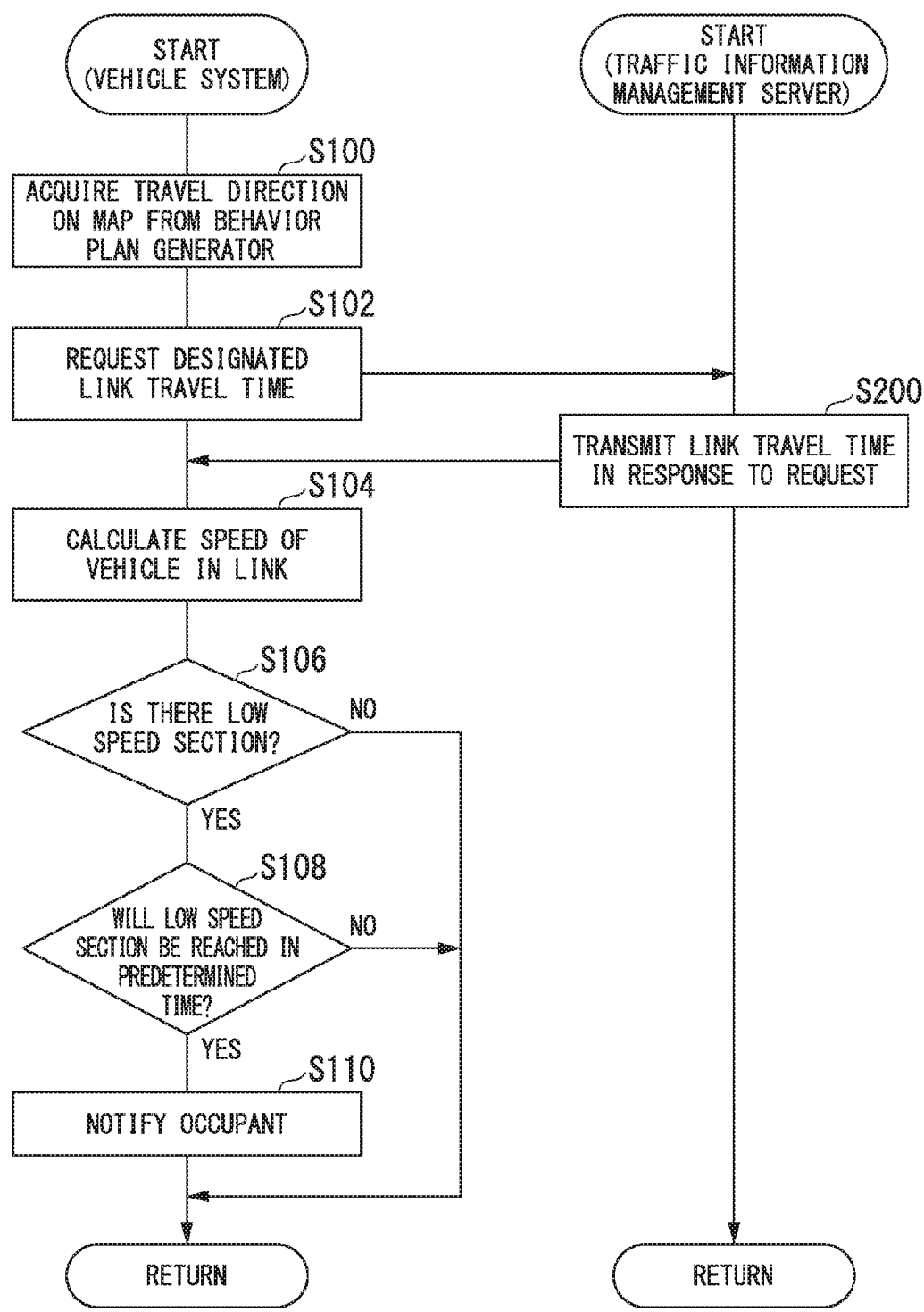
FIG. 6 is a flowchart showing a flow of processing executed by the vehicle system 1 mounted in the own vehicle M.

FIG. 6 is a flowchart showing a flow of processing executed by the vehicle system 1 and the traffic information management server 300. First, the acquirer 121A of the vehicle system 1 acquires the travel direction of the own vehicle M on the map from the behavior plan generator 123 (step S100). Next, on the basis of the travel direction of the own vehicle M on the map acquired in step S100, the acquirer 121A designates one or more links associated with a road in the travel direction of the own vehicle M (a road on a route toward the destination) and requests that the traffic information management server 300 transmit link travel times associated with the designated links (step S102).

Next, the traffic information management server 300 transmits the travel times of the designated links to the own vehicle M in response to the above request (step S200). Thus, the acquirer 121A acquires, from the traffic information management server 300, the travel times of the links included in the route in the travel direction of the own vehicle M on the map acquired in step S100. Next, the acquirer 121A calculates the speeds of vehicles in the links on the basis of the link distances and the acquired link travel times (step S104).

FIG. 7 is a diagram showing information that the vehicle system 1 acquires from the traffic information management server 300 and link travel speeds calculated on the basis of the information. For example, the acquirer 121A causes the storage 121C to store link IDs, link distances, and link travel times acquired from the traffic information management server 300 in association with each other and adds results calculated in step S104 to them. Then, if there is a section (link) whose link travel speed is equal to or less than the first predetermined speed, the determiner 121B determines that the section (link) is a low speed section. For example, in the example of FIG. 7, it is determined that links L1001 and L1002 are low speed sections. In the case in which the link travel time or speed information is acquired for each vehicle, the determiner 121B may perform the same determination as above after obtaining an average value of the vehicles or may determine that the section is a low speed section if the proportion of vehicles traveling at speeds equal to or less than the first predetermined speed is equal to or more than a predetermined value.

Returning to the explanation of FIG. 6, next, the determiner 121B determines whether or not there is a low speed section on the basis of the speed information stored in the storage 121C (step S106). If there is no low speed section, the processing of one routine of this flowchart ends.

If there is a low speed section, the notification controller 130 determines whether or not the own vehicle M will reach the low speed section in a predetermined time on the basis of the current location of the own vehicle M and the speed of the own vehicle M (step S108). Instead of "determining whether or not the own vehicle M will reach the low speed section in the predetermined time," the notification controller 130 may "determine whether or not the distance from the own vehicle M to the low speed section is within a predetermined distance." If the own vehicle M will not reach the low speed section in the predetermined time, the processing of one routine of this flowchart ends.

If the own vehicle M will reach the low speed section in the predetermined time, the notification controller 130 causes the HMI 30 to output notification information indicating that the low speed section will be reached in the predetermined time to notify the occupant of the own vehicle M of the information (step S110). Then, the processing of one routine of this flowchart ends.

Figure 8:
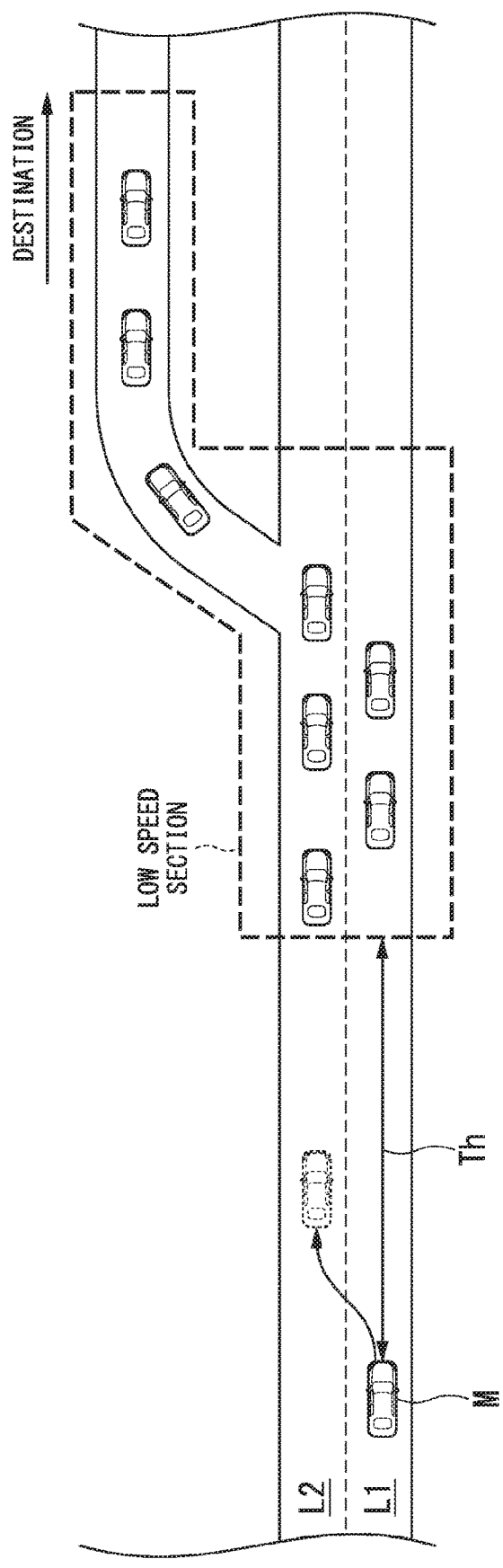
FIG. 8 is a diagram showing an exemplary situation in which notification information is output by an HMI 30.

FIG. 8 is a diagram showing an exemplary situation in which notification information is output by the HMI 30. It is assumed that the own vehicle M is traveling in a lane L1 at a speed higher than the second predetermined speed by automated driving. When the own vehicle M has reached a position from which it will reach a low speed section in the predetermined time (a position that is a distance Th before the start point of the low speed section in the drawing), the notification controller 130 causes the HMI 30 to output notification information. This allows the occupant of the own vehicle M to perceive that the own vehicle M will reach a low speed section in the predetermined time, that is, a low speed following travel during which lane change by the behavior plan generator 123 is prohibited is expected to be executed in the predetermined time. In response to this, for example, the occupant (driver) of the own vehicle M can cause the own vehicle M to change lanes to a lane L2 connected to a branch road L3 toward the destination of the own vehicle M before reaching the low speed section. Lane change in this case may be performed manually after switching to manual driving by override or may be performed by auto lane change with a certain operation of the occupant (for example, an operation of a turn signal) as a trigger.

Further, the notification controller 130 may cause the HMI 30 to output notification information while changing the degree of output of the notification information in a stepwise manner. The notification controller 130 changes the degree of output of the notification information in a stepwise manner, for example, according to the distance between the own vehicle M and the low speed section or according to the time within which the own vehicle M will reach the low speed section. That is, the notification controller 130 causes the HMI 30 to output the notification information such that the degree of output of the notification information increases as the distance between the own vehicle M and the low speed section decreases or the time within which the own vehicle M will reach the low speed section decreases. The notification controller 130 may also cause the HMI 30 to display the distance between the own vehicle M and the low speed section and/or the time within which the own vehicle M will reach the low speed section.

Further, the notification controller 130 may cause the HMI 30 to output the notification information only when the own vehicle M needs to change lanes. Here, the own vehicle M needs to change lanes when the own vehicle M is not traveling in the lane L2 connected to the branch road L3 (i.e. the own vehicle M is traveling in the lane L1) if there is a branch point for entering the branch road L3 from the lane L2 of a main line when the own vehicle M is to travel along a predetermined route as shown in FIG. 8 above.

Even when the own vehicle M is traveling in the lane L2, the notification controller 130 may cause the HMI 30 to output notification information when there is a branch point. This allows the occupant of the own vehicle M to perceive that there is a low speed section. Therefore, it is possible to predict that it will be difficult for the own vehicle M to change lanes to the branch road L3 if it changes lanes from the lane L2 to the lane L1. As a result, on the basis of the prediction, the occupant of the own vehicle M can determine whether or not to change lanes with a certain operation as a trigger.

According to the first embodiment described above, the acquirer 121A configured to acquire information that allows recognition of the speed of other vehicles m present in the travel direction of the own vehicle M, the determiner 121B configured to determine whether or not there is a low speed section whose travel speed is equal to or less than the first predetermined speed in the travel direction of the own vehicle M on the basis of the information acquired by the acquirer 121A, and the automated driving control unit 100 capable of executing an automated driving mode which is executed at the second predetermined speed or less, the automated driving control unit 100 including the notification controller 130 configured to perform causing the HMI 30 to output predetermined information as predetermined control before the own vehicle M reaches the low speed section that has been determined as being present by the determiner 121B, are provided. Thus, the occupant of the own vehicle M can perceive the presence of a section whose travel speed may be equal to or less than the second predetermined speed and can reflect the perception in control of the own vehicle M before reaching the section. As a result, it is possible to prevent the occurrence of a situation in which the own vehicle M cannot proceed to the branch destination if it continues automated driving, thus enhancing adaptability of automated driving.

Second Embodiment

A second embodiment will be described below. In the first embodiment, if a low speed section will be reached in a predetermined time, the notification controller 130 causes the HMI 30 to output notification information. On the other hand, in the second embodiment, if a low speed section will be reached in a predetermined time, the behavior plan generator 123 causes the own vehicle M to change lanes. Here, differences from the first embodiment will be mainly described and descriptions of functions or the like the same as in the first embodiment will be omitted. In the present embodiment, the behavior plan generator 123 and the travel controller 141 are examples of the "controller."

Figure 9:
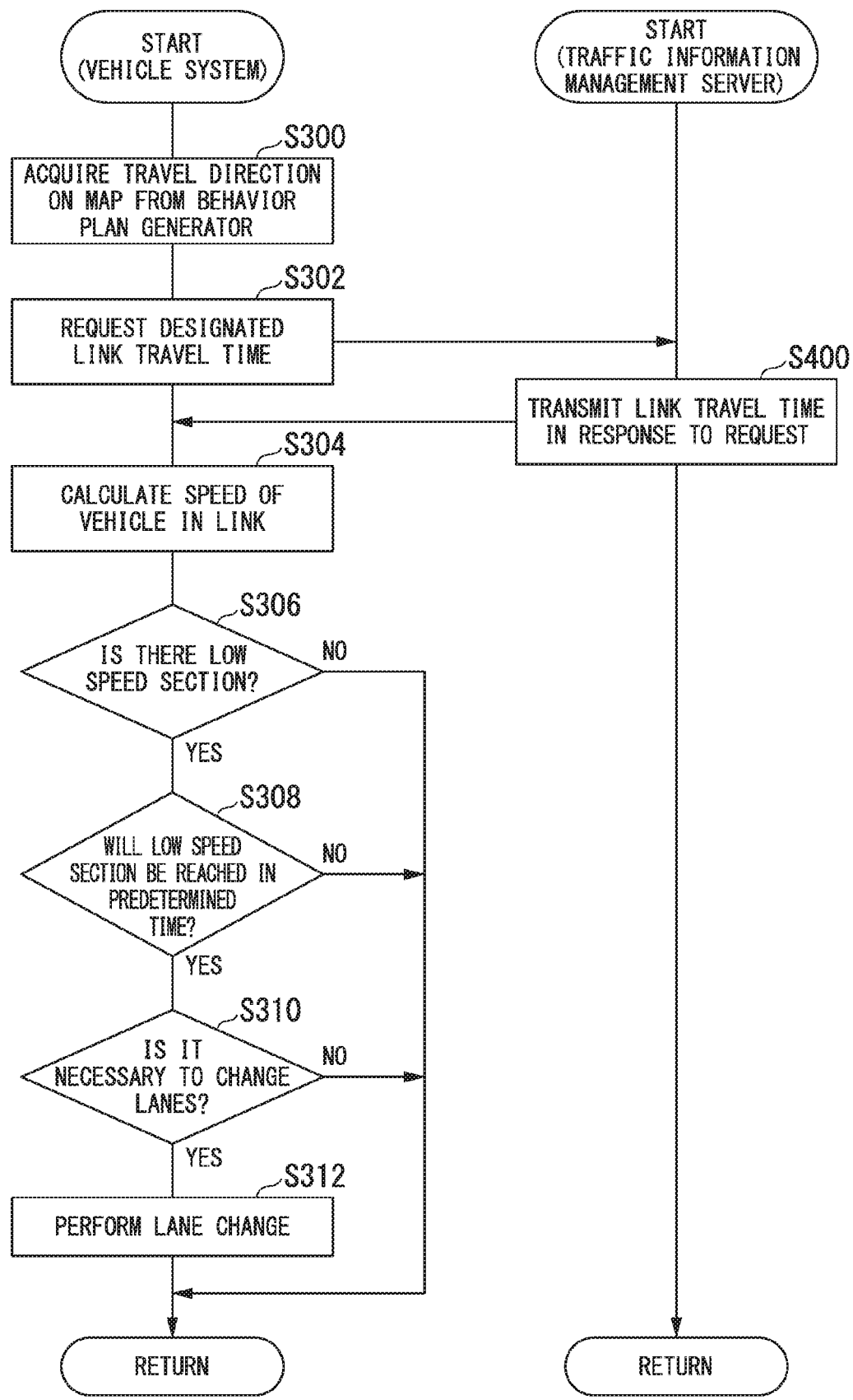
FIG. 9 is a flowchart showing a flow of processing executed by a vehicle system 1 of a second embodiment.

FIG. 9 is a flowchart showing a flow of processing executed by the vehicle system 1 of the second embodiment. First, the acquirer 121A acquires the travel direction of the own vehicle M on the map from the behavior plan generator 123 (step S300). Next, on the basis of the travel direction of the own vehicle M on the map acquired in step S300, the acquirer 121A designates one or more links associated with the travel direction of the own vehicle M and requests that the traffic information management server 300 transmit link travel times associated with the designated links (step S302).

Next, the traffic information management server 300 transmits the travel times of the designated links to the own vehicle M in response to the above request (step S400). Next, the acquirer 121A calculates the speeds of vehicles in the links on the basis of the link distances and the acquired travel times (step S304). Next, the determiner 121B determines whether or not there is a low speed section in the travel direction of the vehicle on the basis of the information stored in the storage 121C (step S306). If there is no low speed section, the processing of one routine of this flowchart ends.

If there is a low speed section, the determiner 121B determines whether or not the own vehicle M will reach the low speed section in a predetermined time on the basis of the current location of the own vehicle M and the speed of the own vehicle M (step S308). If the own vehicle M will not reach the low speed section in the predetermined time, the processing of one routine of this flowchart ends.

If the own vehicle M will reach the low speed section in the predetermined time, the determiner 121B determines whether or not it is necessary for the own vehicle M to change lanes (step S310).

If it is determined that it is necessary for the own vehicle M to change lanes, the behavior plan generator 123 performs lane change of the own vehicle M before the own vehicle M reaches the low speed section (step S312). More strictly, the behavior plan generator 123 completes the lane change of the own vehicle M before the own vehicle M reaches the low speed section. In this case, even if lane change was planned to be performed in the low speed section, the behavior plan generator 123 generates a behavior plan for causing the own vehicle M to complete the lane change before reaching the low speed section. If it is not determined that it is necessary for the own vehicle M to change lanes, the processing of one routine of this flowchart ends.

In the above processing, the processing of one routine in the flowchart ends if it is determined in step S310 that it is not necessary to change lanes in step S310, but instead, for example, the behavior plan controller 123 may prohibit the execution of the lane change after it is determined in step S310 that it is not necessary to change lanes. For example, in the example of FIG. 8 described above, if a branch road L3 is included in a route along which the own vehicle M is scheduled to travel and the own vehicle M is traveling in a lane L2 connected to the branch road L3, the behavior plan generator 123 prohibits lane change from the lane L2 to the lane L1. This prevents the occurrence of a situation in which the own vehicle M cannot return to the lane L2 by automated driving since it has entered the low speed section. Even when the lane change is prohibited, a resulting lane change for obstacle avoidance or the like may be permitted.

In the second embodiment described above, the vehicle system 1 includes the behavior plan generator 123 configured to cause the own vehicle M to perform lane change as predetermined control before the own vehicle M reaches a low speed section that has been determined as being present by the determiner 121B and therefore the own vehicle M can more reliably enter the branch destination by automated driving.

The processing of the flowchart of FIG. 6 of the first embodiment and the processing of the flowchart of the second embodiment may be executed in parallel.

Third Embodiment

A third embodiment will be described below. In the first embodiment, the own vehicle M derives the low speed section on the basis of the link travel time. On the other hand, in the third embodiment, the traffic information management server 300 specifies a low speed section in the travel direction of the own vehicle M and transmits information on the specified low speed section to the own vehicle M. Here, differences from the first embodiment will be mainly described and descriptions of functions or the like the same as in the first embodiment will be omitted.

The server controller 304 in the traffic information management server 300 of the third embodiment specifies a low speed section present in the travel direction of the vehicle on the basis of the link distance and the link travel time. The server controller 304 also transmits the specified low speed section to the own vehicle M.

Figure 10:
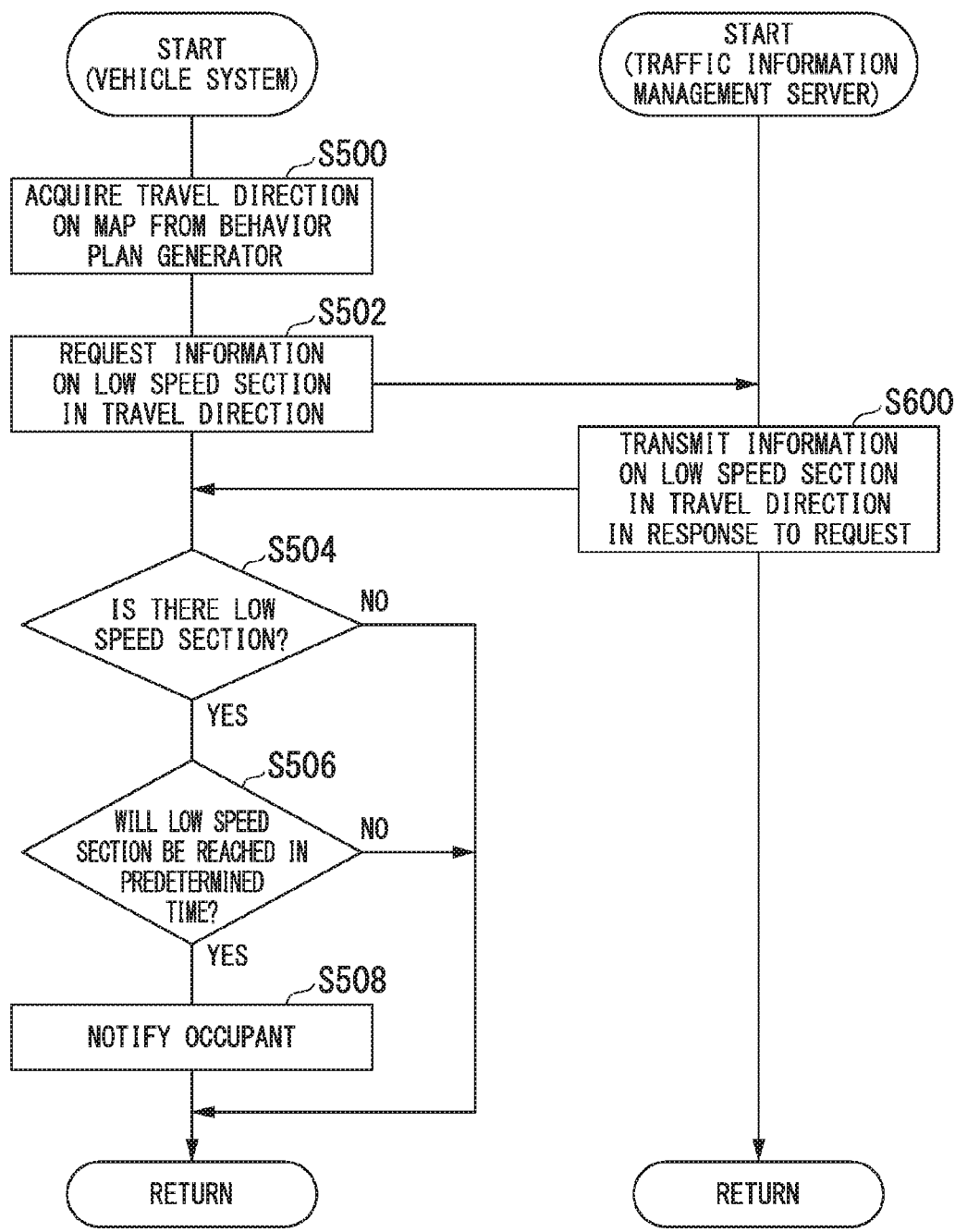
FIG. 10 is a flow chart showing a flow of processing executed by a traffic information providing system of a third embodiment.

FIG. 10 is a flowchart showing a flow of processing executed by a traffic information providing system of the third embodiment. First, the acquirer 121A acquires the travel direction of the own vehicle M on the map from the behavior plan generator 123 (step S500). Next, the acquirer 121A requests that the traffic information management server 300 transmit information (for example, a link ID) of a low speed section present in the travel direction of the own vehicle M on the map acquired in step S500 (step S502). For example, the acquirer 121A requests that the traffic information management server 300 transmit information on a low speed section present within a predetermined distance from the current location of the own vehicle M in the travel direction of the own vehicle M on the map. In response to this request, the traffic information management server 300 transmits, to the own vehicle M, information on a low speed section present within the predetermined distance from the current location of the own vehicle M (step S600). If no low speed section is present within the predetermined distance from the current location of the own vehicle M, the traffic information management server 300 transmits information indicating that no low speed section is present to the own vehicle M.

Next, the determiner 121B determines whether or not there is a low speed section on the basis of the information acquired from the traffic information management server 300 (step S504). If there is no low speed section, the processing of one routine of this flowchart ends.

If there is a low speed section, the determiner 121B determines whether or not the own vehicle M will reach the low speed section in a predetermined time on the basis of the current location of the own vehicle M and the speed of the own vehicle M (step S506). If the own vehicle M will not reach the low speed section in the predetermined time, the processing of one routine of this flowchart ends.

If the own vehicle M will reach the low speed section in the predetermined time, the notification controller 130 causes the HMI 30 to output notification information indicating that the low speed section will be reached in the predetermined time to notify the occupant of the own vehicle M of the information (step S508). Then, the processing of one routine of this flowchart ends.

If it is determined in step S506 that the vehicle M will reach the low speed section in the predetermined time, the determiner 121B may determine whether or not it is necessary for the own vehicle M to change lanes. If the determiner 121B determines that it is necessary to change lanes, the behavior plan generator 123 performs the lane change of the own vehicle M before the own vehicle M reaches the low speed section. More strictly, the behavior plan generator 123 completes the lane change of the own vehicle M before the own vehicle M reaches the low speed section. The notification controller 130 may also cause the HMI 30 to output notification information indicating that the low speed section will be reached in the predetermined time if the determiner 121B determines that it is necessary to change lanes and the first controller 120 determines that it is not possible to perform lane change by automated driving on the basis of the nearby situations.

In the description of the above processing, the traffic information management server 300 transmits information on the low speed section to the own vehicle M in response to a request from the own vehicle M. However, the traffic information management server 300 may acquire the position of the own vehicle M from the own vehicle M at predetermined intervals and transmit information indicating that the own vehicle M is approaching a low speed section to the own vehicle M when the own vehicle M has reached a predetermined distance or less before the low speed section or at a predetermined time before the own vehicle M reaches the low speed section. In this case, the own vehicle M causes the HMI 30 to output notification information upon acquiring the information indicating that it is approaching the low speed section from the traffic information management server 300.

According to the third embodiment described above, the vehicle system 1 acquires a low speed section present in the travel direction of the own vehicle M from the traffic information management server 300 and executes predetermined control on the basis of the acquired information and thus it is possible to reduce a processing load while achieving the same advantages as those of the first embodiment.

Although the modes for carrying out the present invention have been described above by way of embodiments, the present invention is not limited to these embodiments at all and various modifications and substitutions can be made without departing from the gist of the present invention.

REFERENCE SIGNS LIST

1 Vehicle system
100 Automated driving control unit
120 Controller
121 External environment recognizer
121A Acquirer
121B Determiner
121C Storage
122 Own vehicle position recognizer
123 Behavior plan generator
130 Notification controller
300 Traffic information management server
302 Communicator
304 Server controller
306 Server storage

What is claim is:

1. A vehicle control system comprising:
an acquirer configured to acquire information that allows recognition of a speed of another vehicle in a travel direction of an own vehicle;
a determiner configured to determine whether or not a low speed section whose travel speed is equal to or less than a first predetermined speed is present in the travel direction of the own vehicle on the basis of the information acquired by the acquirer; and
a controller capable of executing a first automated driving mode which is capable of executing when the own vehicle travels at a first speed that is equal to or less than a reference speed or a second automated driving mode which is capable of executing at least when the own vehicle travels at a second speed that is greater than the reference speed, the first automated driving mode being a mode in which lane change is not performed, the second automated driving mode being a mode in which lane change is performed, the controller being configured to, in a case that the own vehicle travels on a first lane that is not linked to a destination at the second speed during control based on the second automated driving mode, cause the own vehicle to move to a second lane that is linked to the destination before the own vehicle reaches the low speed section that has been determined as being present by the determiner, the low speed section being a section in which the own vehicle plans to travel in the first automated driving mode,
wherein the controller is further configured to:
cause the own vehicle to move to the second lane in a case that:
the own vehicle travels on the first lane at the second speed during control based on the second automated driving mode, and
the own vehicle is capable of completing movement to the second lane before reaching the low speed section; and
notify a driver of information that the own vehicle reach the low speed section after a predetermined time elapses and it is necessary to change lanes, in a case that:

the own vehicle travels on the first lane at the second speed during control based on the second automated driving mode, and the own vehicle is not capable of completing movement to the second lane before reaching the low speed section.

2. The vehicle control system according to claim 1, wherein the controller is configured to perform, as a predetermined control, causing an output unit to output predetermined information before the own vehicle reaches the low speed section.

3. The vehicle control system according to claim 1, wherein the controller is configured to perform, as a predetermined control, causing the own vehicle to change lanes before the own vehicle reaches the low speed section.

4. The vehicle control system according to claim 1, wherein the controller is configured to perform a predetermined control if in the low speed section there is a branch point for entering a branch road from a main line when the own vehicle is to travel along a predetermined route.

5. The vehicle control system according to claim 1, wherein the controller is configured to perform prohibition of lane change as a predetermined control when the own vehicle is traveling in a lane connected to a branch road if in the low speed section there is a branch point for entering the branch road from a main line when the own vehicle is to travel along a predetermined route.

6. The vehicle control system according to claim 1, wherein the controller is capable of executing the automated driving mode in which lane change is performed when avoiding an obstacle.

7. The vehicle control system according to claim 1, wherein the controller is further configured to:

in a case that the own vehicle travels on the first lane at the second speed in controlling based on the second automated driving mode, cause the own vehicle to move to the second lane before the own vehicle reaches the low speed section, and execute the first automated driving mode after the own vehicle had moved to a lane and had reached the low speed section.

8. The vehicle control system according to claim 1, wherein the controller is further configured to:

in a case that the own vehicle travels on the first lane at the second speed in controlling based on the second automated driving mode and it is estimated that the own vehicle will reach a start position in the low speed section after the predetermined time elapses, notify the driver of information in which it is estimated that the own vehicle will reach the start position after the predetermined time elapses.

9. The vehicle control system according to claim 2, wherein the controller is configured to perform, as the predetermined control, causing the own vehicle to change lanes before the own vehicle reaches the low speed section.

10. The vehicle control system according to claim 2, wherein the controller is configured to perform the predetermined control if in the low speed section there is a branch point for entering a branch road from a main line when the own vehicle is to travel along a predetermined route.

11. The vehicle control system according to claim 2, wherein the controller is configured to perform prohibition of lane change as the predetermined control when the own vehicle is traveling in a lane connected to a branch road if in the low speed section there is a branch point for entering the branch road from a main line when the own vehicle is to travel along a predetermined route.

12. The vehicle control system according to claim 2, wherein the controller is capable of executing the automated driving mode in which lane change is performed when avoiding an obstacle.

13. A vehicle control system comprising:

an acquirer configured to acquire information that allows recognition of a speed of another vehicle in a travel direction of an own vehicle;

a determiner configured to determine whether or not a low speed section whose travel speed is equal to or less than a reference speed is present in the travel direction of the own vehicle based on the information acquired by the acquirer; and a controller selectively capable of executing a first automated driving mode which is capable of executing when the own vehicle travels at a first speed that is equal to or less than the reference speed or a second automated driving mode which is capable of executing at least when the own vehicle travels at a second speed that is greater than the first speed, the first automated driving mode being a mode in which lane change is not performed, the second automated driving mode being a mode in which lane change is performed, the controller being configured to, in a case that the own vehicle travels on a first lane that is not linked to a destination at the second speed during control based on the second automated driving mode, cause the own vehicle to move to a second lane that is linked to the destination before the own vehicle reaches the low speed section that has been determined as being present by the determiner, the low speed section being a section in which the own vehicle plans to travel at the first speed that is equal to or less than the reference speed in the first automated driving mode, wherein the controller is further configured to:

cause the own vehicle to move to the second lane in a case that:

the own vehicle travels on the first lane at the second speed during control based on the second automated driving mode, and the own vehicle is capable of completing movement to the second lane before reaching the low speed section; and notify a driver of information that the own vehicle reach the low speed section after a predetermined time elapses and it is necessary to change lanes, in a case that:

the own vehicle travels on the first lane at the second speed during control based on the second automated driving mode, and the own vehicle is not capable of completing movement to the second lane before reaching the low speed section.

14. The vehicle control system according to claim 13, wherein the controller is further configured to perform, as a predetermined control, to cause the own vehicle to change lanes before the own vehicle reaches the low speed section.

15. The vehicle control system according to claim 13, wherein the controller is further configured to:

in a case that the own vehicle travels on the first lane at the second speed in controlling based on the second automated driving mode, cause the own vehicle to move to the second lane before the own vehicle reaches the low speed section, and execute the first automated driving mode after the own vehicle had moved to a lane and had reached the low speed section.

16. The vehicle control system according to claim 13, wherein the controller configured to, in a case that the own vehicle travels on the first lane at the second speed in controlling based on the second automated driving mode and it is estimated that the own vehicle will reach a start position in the low speed section after the predetermined time elapses, notify the driver of information in which it is estimated that the own vehicle will reach the start position after the predetermined time elapses.

17. A vehicle control method using a vehicle control device, the vehicle control method comprising:
- acquiring information that allows recognition of a speed of another vehicle in a travel direction of an own vehicle;
- determining whether or not a low speed section whose travel speed is equal to or less than a reference speed is present in the travel direction of the own vehicle based on the information; and
- selectively executing a first automated driving mode which is capable of executing when the own vehicle travels at a first speed that is equal to or less than the reference speed or a second automated driving mode which is capable of executing at least when the own vehicle travels at a second speed that is greater than the reference speed, the first automated driving mode being a mode in which lane change is not performed, the second automated driving mode being a mode in which lane change is performed, in a case that the own vehicle travels on a first lane that is not linked to a destination at the second speed during control based on the second automated driving mode, causing the own vehicle to move to a second lane that is linked to the destination before the own vehicle reaches the low speed section that has been determined as being present, the low speed section being a section in which the own vehicle plans to travel in the first automated driving mode, wherein the vehicle control method further comprises:
causing the own vehicle to move the second lane in a case that:
- the own vehicle travels on the first lane at the second speed during control based on the second automated driving mode, and
- the own vehicle is capable of completing movement to the second lane before reaching the low speed section; and notifying a driver of information that the own vehicle reach the low speed section after a predetermined time elapses and it is necessary to change lanes, in a case that:
- the own vehicle travels on the first lane at the second speed during control based on the second automated driving mode, and
- the own vehicle is not capable of completing movement to the second lane before reaching the low speed section.

* * * * *